United States Patent [19]

Hallett

[11] Patent Number: 5,133,945
[45] Date of Patent: Jul. 28, 1992

[54] UV LAMP TRANSMITTANCE CONTROLLER

[75] Inventor: Ron C. Hallett, Pickering, Canada

[73] Assignee: Solarchem Enterprises Inc., Ontario, Canada

[21] Appl. No.: 717,781

[22] Filed: Jun. 17, 1991

[51] Int. Cl.[5] ............................................ B01J 19/08
[52] U.S. Cl. .................................................. 422/186.3
[58] Field of Search ............................ 422/186, 186.3; 250/431, 432 R, 436

[56] References Cited

U.S. PATENT DOCUMENTS

| | | | |
|---|---|---|---|
| 3,462,597 | 8/1969 | Young | 250/431 |
| 3,562,520 | 2/1971 | Hippen | 250/372 |
| 3,904,363 | 9/1975 | Free | 250/431 |
| 4,002,918 | 1/1977 | Graentzel | 250/431 |

Primary Examiner—Brooks H. Hunt
Assistant Examiner—Daniel J. Jenkins
Attorney, Agent, or Firm—Lowe, Price, LeBlanc & Becker

[57] ABSTRACT

A high intensity, high temperature UV Lamp reactor system for treating aqueous media on a continuous flow basis is provided. The reactor system comprises:

a cylindrical reactor vessel, having inlets and outlets which permit the aqueous media to flow on a continuous basis through the reactor, a cylindrical UV lamp provided in the vessel and concentric therewith, a cylindrical UV transparent sheath for isolating the UV lamp from the interior space of the reactor vessel, the sheath and lamp being concentric with the cylindrical vessel, the sheath being sealed to the ends of the vessel to isolate the UV lamp from the aqueous media flowing through the annular reactor chamber, a brush device is provided for brushing the exterior surface of the sheath to remove therefrom materials deposited from the aqueous media, the brush having at least two brushes with bristles extending radially inwardly towards the sheath as the brushes encompass the sheath, the brushes are coupled together in spaced apart manner on the sheath with a device for reciprocating the brushes along the sheath exterior, preferably on a periodic basis to remove any deposited material from the sheath and thereby maintain an acceptable level of UV radiation transmitted into the annular chamber of the reactor.

16 Claims, 4 Drawing Sheets

UV LAMP TRANSMITTANCE CONTROLLER

FIELD OF THE INVENTION

This invention relates to a reactor having ultraviolet (UV) lamps, the radiation from which treats a fluid medium; e.g., water, air or solvent. More particularly, the invention relates to systems and devices which are used to maintain a desired degree of transmittance of UV radiation through UV transparent protective sheaths for UV lamps.

BACKGROUND OF THE INVENTION

Ultraviolet radiation is an important workhorse in the industrial community for promoting chemical reactions, initiating chemical reactions, degrading organic and non-organic molecules, inducing mutations in biological systems, acting as an antiviral and bactericidal agent and the like. Normally the source of the ultraviolet radiation is emitted from an electric discharge lamp having various types of gases which when excited by the electric discharge, emit UV radiation. These lamps are generally categorized as low or medium/high intensity lamps. They may operate at low or high pressures for gases within the lamps. Normally the lamps are of a quartz material which is transparent to the emitted UV radiation. The lamps may operate at low or high temperatures ranging from approximately 30° C. up to 950° C. The output of these lamps may range from less that 40 watts to in excess of 30,000 watts. The lamps may be even customized to the extent that a certain portion of the UV spectrum is omitted or enhanced rather than the entire portion of the UV spectrum.

A driving force for such variety in UV lamps is that each of the above industrial applications requires lamps having different UV intensities, different wavelength of emission, operating pressure and temperatures and power requirements.

Normally the lamps, as employed in reactor systems, particularly reactor systems which contain aqueous media, have a variety of UV transparent protective sheaths within which the lamps are placed so that the lamps do not come in contact with the material being treated by the UV radiation. This technique protects the quartz of the UV lamp and the electrical connections to the lamp electrodes. Also it can facilitate lamp replacement without having to disassemble the reactor.

One of the significant problems with UV transparent protective sheaths for the UV lamps is the fact that materials within the aqueous systems or media being treated may deposit on the sheath exterior surface and hence reduce the degree of UV radiation transmitted through the sheath thereby reducing the effectiveness of the reaction or UV treatment taking place within the reactor.

A variety of approaches have been provided to overcome this significant problem in reduction of the UV transmission through the protective sheaths during reactor operation. The most common approach has been to shut down the reactor after several hours or days of operation to permit removal, cleaning and replacement of the protective sheaths. This is an expensive time consuming procedure for lamp cleaning. The problem however with other cleaning devices is providing systems which are resistant to high intensity UV radiation and when necessary can withstand close proximity to the very high temperatures of the high pressure high intensity lamps which may reach 950° C.

Examples of cleaning systems used with low temperature UV lamps are disclosed in U.S. Pat. Nos. 3,462,597; 3,562,520 and 3,904,363.

U.S. Pat. No. 3,462,597 discloses a UV lamp system for use in water purification by virtue of the bactericidal and other UV sensitive contaminants being neutralized in the water. The system involves the use of a lamp which operates at a temperature of approximately 105° F. i.e. in the 30°-35° C. range. Since the contaminated water to be treated contains certain physical impurities which tend to deposit on the outside of the quartz tube, such deposits including mineral deposits, protein deposits and the like. A wiper system is provided for the protective sheath for the UV lamp. The wiper system comprises wiper rings which are made of teflon or any other material not affected by UV radiation and are spaced apart from one another. The rings are preferably split and are elastically or resiliently held on the outside of the protective tube by a garter spring. This provides for "efficient" wiping action. The wiping rings are on a ring holder and a rod which extends through an end or the reactor engages the ring holder. The ring holder is then reciprocated to provide a wiping action along the protective tube to remove physical or biological materials which had deposited on the outside of the protective tube. This system is totally inadequate however by virtue of the dimensional variations in the protective tube which is normally made of quartz and the inability to resist high temperature operations in the range of 250° C. to 800° C. The teflon would immediately deteriorate at such high temperatures. The elastic garter is normally inadequate to vary the dimension of the wiping rings during use as the rings are moved along the quartz tube.

U.S. Pat. No. 3,562,520 discloses another type of water purifying apparatus involving the use of a wiper system to routinely clean the protective tube made of quartz for the UV lamp position within the reactor. The wiper system consists of a number of ring-like wiper elements surrounding and in wiping contact with the external surface of the protective tube. The wiper assembly is urged along the tube by a coil spring When water to be treated flows through the reactor the wiper returns to the other end of the tube to effect a wiping of the area of the tube between the inlet and outlet of the treatment system. This ensures that the protective tube is clean of deposits during each start-up of the water purifying device, however, should water flow through the device for any extended period of time, deposits from the water may reform on the protective tube thereby reducing the degree of UV transmittance and thereby the effectiveness of the radiation in treating bacteria in the water. This system would be totally inadequate for treatments involving continuous flow of water over extended periods of time.

In U.S. Pat. No. 3,904,363 a similar problem arises as with the device of U.S. Pat. No. 3,562,520. The wiper system is activated by water flow. For an extended continuous flow of water, the protective tube would not be cleaned. The flow of water moves the wiper system to one end of the tube and keep it there. When the water shuts off, due to the vertical orientation of the reactor, the wipers descend to the base of the reactor under the influence of gravity. The wiper system is made up of a flexible semi-rigid plastic or flexible metal membrane. The membrane may be a brush-like textured membrane of composite or plastic material. The membrane however in contacting the protective tube, is very thin and is usually inadequate for removing stubborn deposits on the protective sheath. Furthermore, under high intensity UV radiation from high powered lamps, the plastic version of this wiper would deteriorate rapidly.

It has already been mentioned that UV radiation is used in a variety of commercial applications. Applications where deposits on protective sheaths for the UV lamps are particularly troublesome is in the treatment of waste aqueous media related to ground water pollution, organic chemical manufacturing, petroleum refineries, wood preserving operations, pulp and paper bleach plant effluent, multicontaminant landfill leachates, electroplating in metals treatment, explosives manufacturing and handling low level toxins in drinking water. A reliable low maintenance system for removing deposits on the protective tubes is desired to ensure efficient operation of the reactor over extended periods of time.

SUMMARY OF THE INVENTION

According to an aspect of the invention, an apparatus for removing material deposited on a protective sheath enclosing a UV lamp where the material is deposited on the sheath from an aqueous solution passing over the sheath and through which the solution is exposed to UV radiation from the UV lamp. The apparatus comprises:
a) a brush having a bristle holder adapted for surrounding the sheath, the bristle holder having a plurality of bristles extending inwardly from the bristle holder,
b) the brush being dimensioned such that the bristles along the brush holder surrounding the sheath are flexed at least when the brush is moved along the sheath to remove material deposited on the sheath,
c) the bristles being individually in point contact with the sheath as tips of the bristles contact the sheath, and
d) means for connecting the brush to an external drive for reciprocating the brush along the sheath, the connecting means being adapted to accommodate lateral movement of the brush as the brush moves along the sheath.

In a reactor according to another aspect of the invention which has at least one UV radiation lamp for treating an aqueous solution, the lamp being positioned in the reactor within a protective UV radiation transparent sheath, the lamp being isolated from the aqueous solution by the sheath, means for removing material deposited on the sheath from an aqueous solution being treated in the reactor, the improvement in the means for removing material deposited on the sheath comprising:
a) a brush having a bristle holder adapted for surrounding the sheath, the bristle holder having a plurality of bristles extending inwardly from the bristle holder,
b) the brush being dimensioned such that the bristles along the brush holder surrounding the sheath are flexed at least when the brush is moved along the sheath to remove material deposited on the sheath,
c) the bristles being individually in point contact with the sheath as tips of the bristles contact the sheath, and
d) means for connecting the brush to an external drive for reciprocating the brush along the sheath, the connecting means being adapted to accommodate lateral movement of the brush as the brush moves along the sheath.

According to another aspect of the invention, a high intensity, high temperature UV lamp reactor system for treating aqueous media on a continuous flow basis is provided. The reactor system comprises:
a) a cylindrical reactor vessel having an inlet near the first end and an outlet near a second end to permit aqueous media to flow on a continuous basis through the vessel,
b) a cylindrical UV lamp is provided in the vessel and extends along and centrally of the vessel,
c) a cylindrical UV transparent sheath for physically isolating the UV lamp from interior space of the reactor vessel is provided, the sheath extending along and centrally of the reactor vessel and is of a length at least equal to a UV radiation emitting portion of the UV lamp,
d) means is provided for connecting and sealing the first and second ends of the vessel to the sheath to isolate thereby the UV lamp and to define in the vessel an annular reactor chamber in liquid communication with the inlet and the outlet,
e) means is provided for brushing an exterior surface of the sheath in the annular chamber,
f) the brush means has at least two brushes each of which has an annular bristle holder having a plurality of bristles extending radially inwardly from the bristle holder,
g) the bristle have tips which define a circular opening for surrounding the sheath, the circular opening is of a diameter less than an outside diameter for the sheath,
h) means is provided for coupling the brushes in spaced apart manner on the sheath, the coupling means being connected to the brush holder of each brush,
i) means is provided for reciprocating the brush means along the sheath to brush the exterior surface of the sheath along its length, and
j) means is provided for connecting the reciprocating means to the coupling means for the brush means.

BRIEF DESCRIPTION OF THE DRAWINGS

Preferred embodiments of the invention are showed in the drawings wherein.

DETAILED DESCRIPTIONS OF THE PREFERRED EMBODIMENTS

Figure 1:
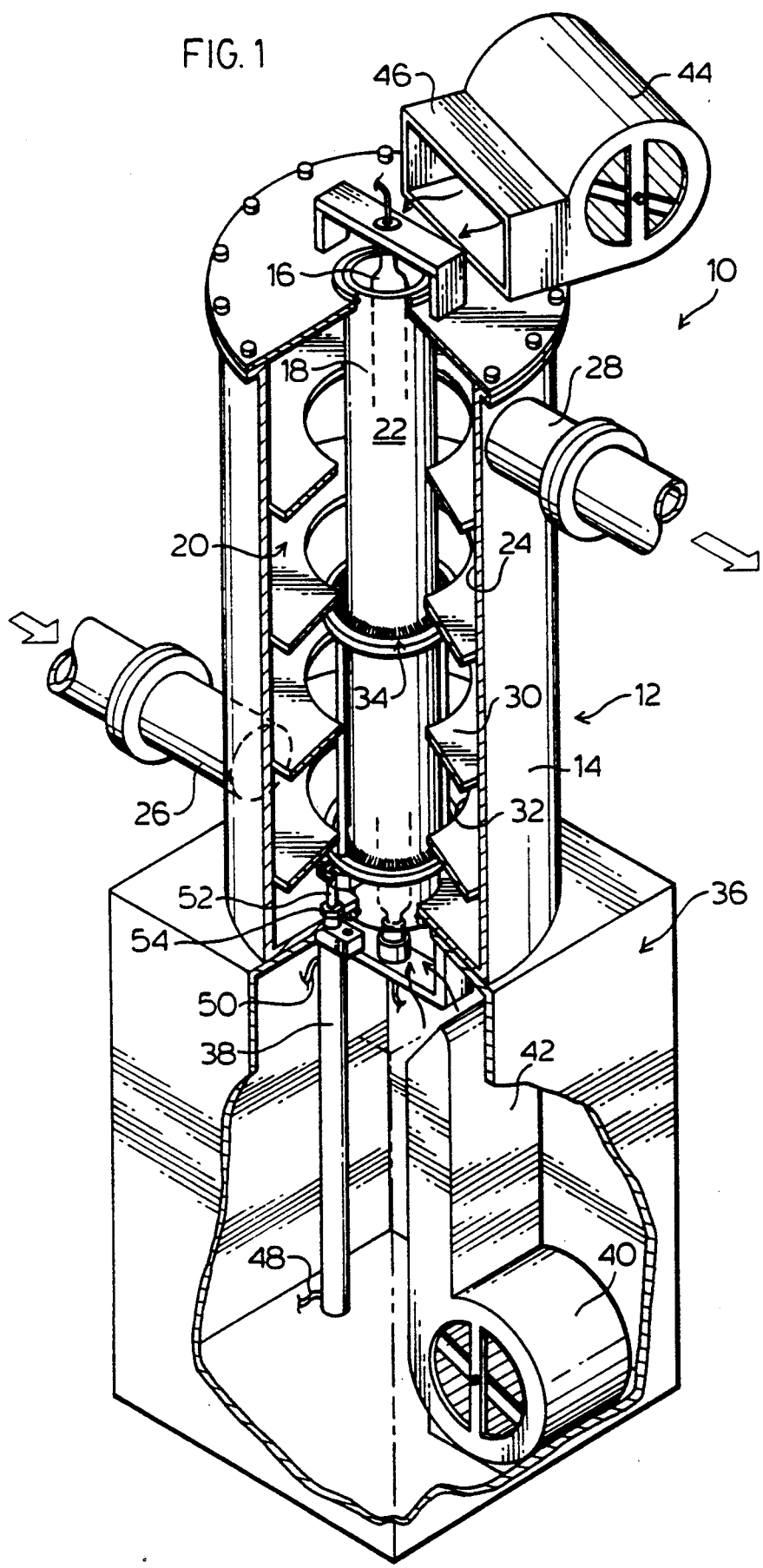
FIG. 1 is perspective view of the reactor system according to a preferred embodiment of the invention in which a portion of the reactor is removed to permit illustration of the system for removing materials deposited on the protective sheath for the UV lamp.

A preferred embodiment of the invention is illustrated with respect to a high intensity high temperature UV lamp reactor system. It is appreciated however that the system of this invention for removing deposits from protective sheaths for the UV lamps and in essence thereby controlling the transmittance through the protective sheath, may be applied to any other type of UV lamp reactor system that employs protective sheaths requiring cleaning. Although the system is particularly adapted for high temperature use, the other features and advantages of the system may be readily used on other types of UV lamp systems which may be low temperature and low intensity. In particular, a preferred embodiment of the invention as shown in FIG. 1 uses a high pressure high temperature UV lamp which is capable of generating high intensity UV radiation with a power consumption in the range of 30,000 watts and operating normally at a temperature in the range of 950° C. It is generally understood that low, medium/high intensity lamps have the following parameters of operation. Low intensity lamps operate at low pressures in the range of $10^{-2}$ to $10^{-3}$ Torr at 40° C. The medium/high intensity lamps operate at higher pressures in excess of $10^2$ Torr at 600° C. to 950° C.

The reactor 10 of FIG. 1 comprises a reactor vessel 12 defined by an outside reactor wall 14. According to this embodiment, the reactor vessel 12 is cylindrical in shape although it is appreciated that the transmittant controller, that is, device for cleaning the protective sheath for the lamp, may be employed in a variety of other reactor shapes. According to this embodiment, a high intensity elongate lamp 16 is located centrally of and extends along the reactor vessel 12. Within the reactor vessel 12, a UV transparent protective sheath 18 is provided which encompasses and isolates the UV lamp from the interior of the reactor vessel 12. The cylindrically shaped sheath is positioned centrally of the reactor vessel thereby defining an annular space 20 between the exterior surface 22 of the protective sheath and the interior surface 24 of the reactor outside wall 14. Aqueous media to be treated within the reactor 12 flows into the annular reactor chamber 20 through an inlet conduit 26. The treated effluent flows out of the annular reactor chamber 20 through outlet 28.

According to the embodiment of FIG. 1, a plurality of baffles 30 are secured to the inside surface 4 of the outer wall 14, each baffle is circular shaped with a central opening 32 which provides clearance for the protective sheath 18 as well as the system generally designated 34 for cleaning the protective sheath. The baffles are provided within the annular chamber 20 to induce turbulence in the flow to ensure adequate mixing so that during the residence time for the aqueous media all portions thereof are exposed to the UV radiation from lamp 16 to ensure the desired treatment for the aqueous media.

The reactor 12 is supported on a base 36 which houses an external drive 38 for the sheath cleaning system 34 as well as a cooling fan 40 for directing through duct 42 a flow of cooling air on to the UV lamp 16. The other end of the UV lamp is correspondingly cooled by a fan 44 directing cooling air on to the lamp tip through duct 46.

The device for reciprocating the cleaning system 34 is located externally of the reactor. According to this embodiment, a pneumatic cylinder having air pressure fed to the cylinder through lines 48 and 50 reciprocate the piston rod 52 upwardly and downwardly through the reactor annular chamber 20. The piston rod is sealed to a reactor end by gland 54 which is adequate to prevent leakage of aqueous media from within the annular reactor chamber and to prevent outside air from leaking into the fluid medium being treated. The gland and its sealingability about the rod 52 is selected dependant upon the pressures and corrosive nature of the aqueous media to be treated.

Figure 2:
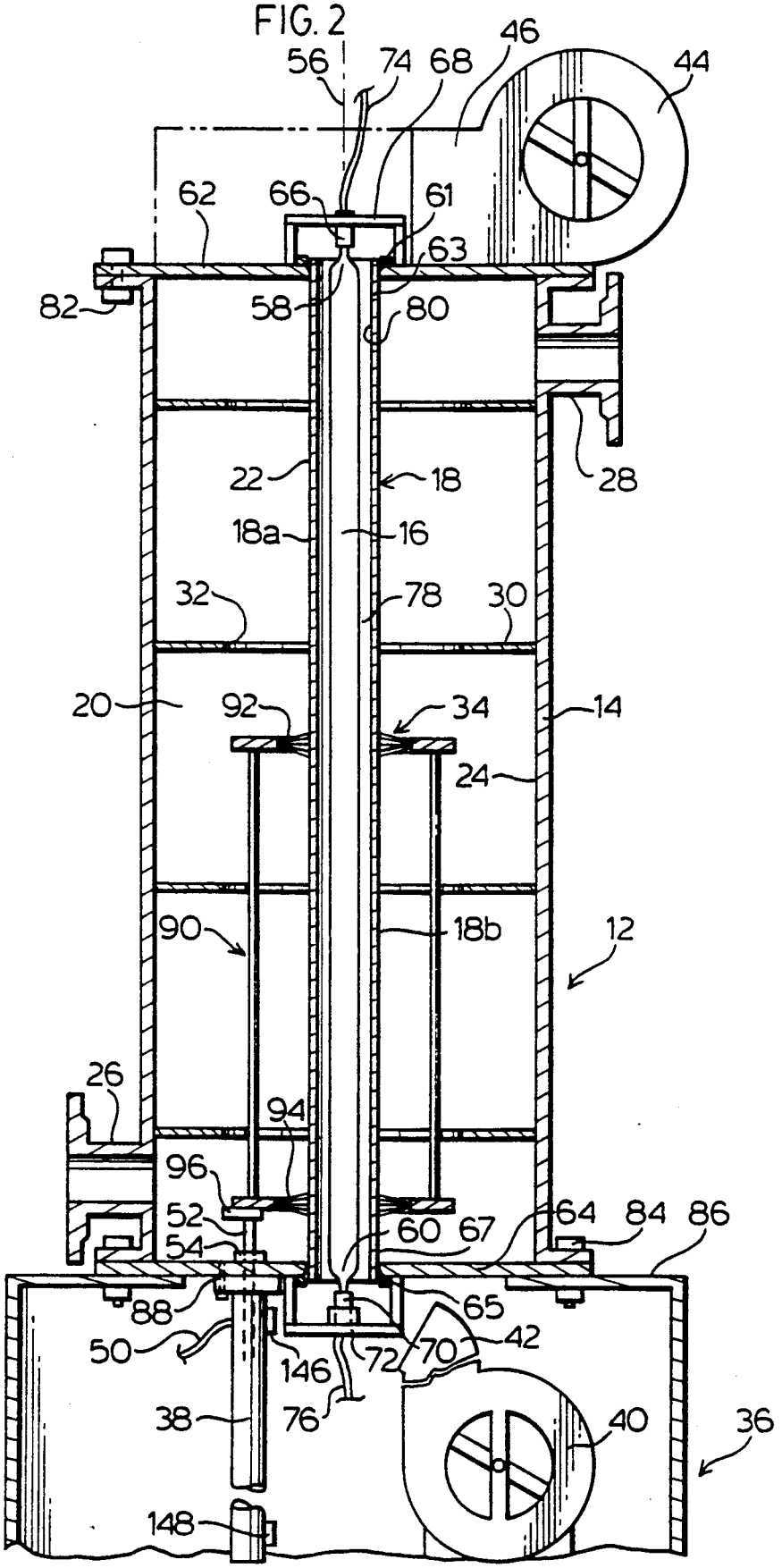
FIG. 2 is a longitudinal section through the reactor of FIG. 1.

As shown in FIG. 2, the UV lamp 16 is coincident with the longitudinal axis 56 of the cylindrical reactor 14. The lamp ends 58 and 60 extend beyond the end plates 62 and 64 for this cylindrical reactor.

The supports for the lamp ends 58 and 60 are provided externally of the end plates 62 and 64 for the reactor. The lamp end 58 has a ceramic mount 66 which is secured in a U-shaped bracket 68. The U-shaped bracket 68 is secured to the end plate 62. Similarly, lamp end 60 has ceramic mount 70 which is secured in the U-shaped bracket 72. In turn the U-shaped bracket 72 is secured to the outside of end plate 64. The mounting brackets 68 and 72 position the lamp 16 along the longitudinal axis 56 of the reactor. Suitable electrical leads 74 and 76 are provided at each lamp end for purposes of powering the lamp.

The quartz tube 18 is sealed at its ends to the end plate 62 and 64 to prevent leakage of aqueous media from the annular reactor chamber 20. As shown in FIG. 2, appropriate sealing rings 61 surround the end 63 of the quartz tube at end plate 62. Correspondingly, at end plate 64, sealing ring 65 surrounds and seals the end 67 to the end plate 64. It is appreciated that a variety of seals are available to effect the sealing of the two ends of the quartz tube to the end plate to prevent leakage. Such suitable seals includes synthetic rubbers, which are clamped to the quartz tube end and secured to the respective end plate 62 and 64. In this manner, ready disassembly of the quartz sheath 18 from the end plates is achieved.

Certainly with high intensity high power lamps operating at temperatures in the range of 600° C. to 950° C., external cooling is required. As already identified in FIG. 1, a cooling fan 40 directs cooling air on to the ceramic mount portion 70 of the lamp end 60. The cooling air is directed by the duct 42. Similarly on the top, near lamp end 58, a cooling fan 44 through duct 46 directs cooling air onto the ceramic mount 66. The cooling air is necessary to ensure that the electrodes sealed into the lamp ends do not degrade due to the high temperatures in the quartz tube of the lamp 16. Air, which is directed for cooling of the lower portion of the lamp, may enter and rise through the annular space 78 defined between the lamp 16 and the interior surface 80 of the protective sheath 18. The upper part of the sheath 18 is open to allow such circulating air to exit at the top to further enhance the cooling of the system.

The inlet 26 for the reactor is located near or adjacent the first end plate 64. Similarly, the outlet 28 is located adjacent or near the second end plate 62 for the reactor. In this manner aqueous media enters one end of the reactor, flows through the annular space 20 and over the baffles 30 for discharge through the outlet 28. The baffles 30 are clear of the apparatus 34 for removing materials deposited on the exterior surface 22 of the sheath 18. For purposes of ease of assembly, the cylindrical reactor 12 has the end plates 62 and 64 bolted thereto in the manner shown by suitable bolts 82 and 84. Bolts 84 extend through the support base upper surface 86 for purposes of securing the reactor to the base 36. The pneumatic cylinder 38 for reciprocating the cleaning device 34 is secured to end plate 64 by bolts 88. The piston rod 52 is secured to a carriage 90 for the individual brushes 92 and 94. Details of the carriage and the connector 96 will be discussed in more detail with respect to FIG. 3. It is apparent however in FIG. 2 that the stroke of piston rod 52 is sufficient to ensure the brush 92 traverses the upper region 18a of the sheath and brush 94 traverses the lower region 18b of the sheath, preferably brush 94 overlaps, to at least some extent in traversing the upper region 8a.

Figure 3:
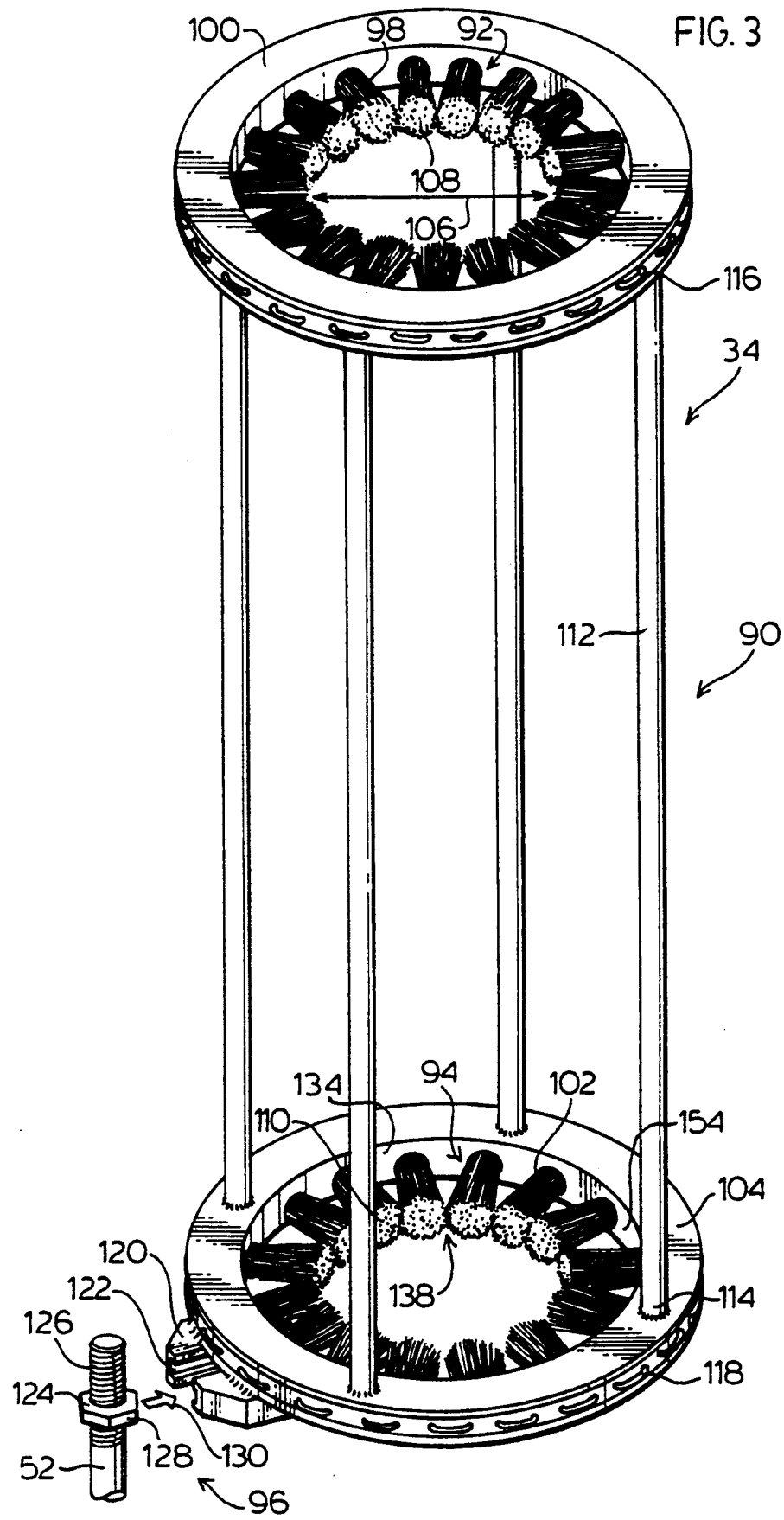
FIG. 3 is a perspective view of the brush device according to a preferred aspect of the invention.

Details of the sheath cleaning device 34 are shown in FIG. 3. The device 34 consists of a brush carriage 90 with brushes 92 and 94. According to this embodiment, each of brushes 92 and 94 is assembled in the following manner. Brush 92 has a plurality of bristles 8. The bristles 98 are mounted in a bristle holder 100. Similarly, brush 94 has a plurality of bristles 102 secured in a bristle holder 104. The bristles, as they extend radially inwardly of the bristle holder, define a circular opening having a diameter 106 which is slightly less than the diameter of the sheath 18. This provides an interference fit between the bristle tips 108 of brush 92 and 110 of brush 94 with respect to the exterior surface 22 of the sheath 18. Further details of this interference fit shall be discussed with respect to FIGS. 4 and 5.

The carriage 90 for the brushes 92 and 94, according to this embodiment, comprises four equal length rods 112. The equal length rods 112 are secured to the bristle holders 100 and 104. According to this embodiment, the end 114 of rod 12 is secured to bristle holder 104 by welding of the rod to the bristle holder. Hence, the bristle holders, in combination with the rods form the carriage 90 or alternatively, the rods with the bristle holders form the necessary coupling in positioning the brushes 92 and 94 in a spaced apart manner as they traverse the sheath 18 in the manner discussed in FIG. 2.

It is appreciated that the materials for the reactor system which are exposed to UV radiation must be made of materials which are resistant to failure due to exposure to UV radiation and possibly high temperatures. Preferably the internal components of the reactor are made of stainless steel. As to the brush system 34, the rods 112 for the carriage 90 may be made of any suitable UV resistant plastic, or metallic materials which includes metals, metal alloys or metal composites. Similarly, the bristle holders 100 and 104 can be made of a suitable UV resistant plastic, metal or metal alloy. 0 The bristles 98 and 102 are also preferably made of a suitable UV resistant plastic which is rigid when in the form of a bristle or be made of thin wire formed from metal or metal alloy.

Figure 4:
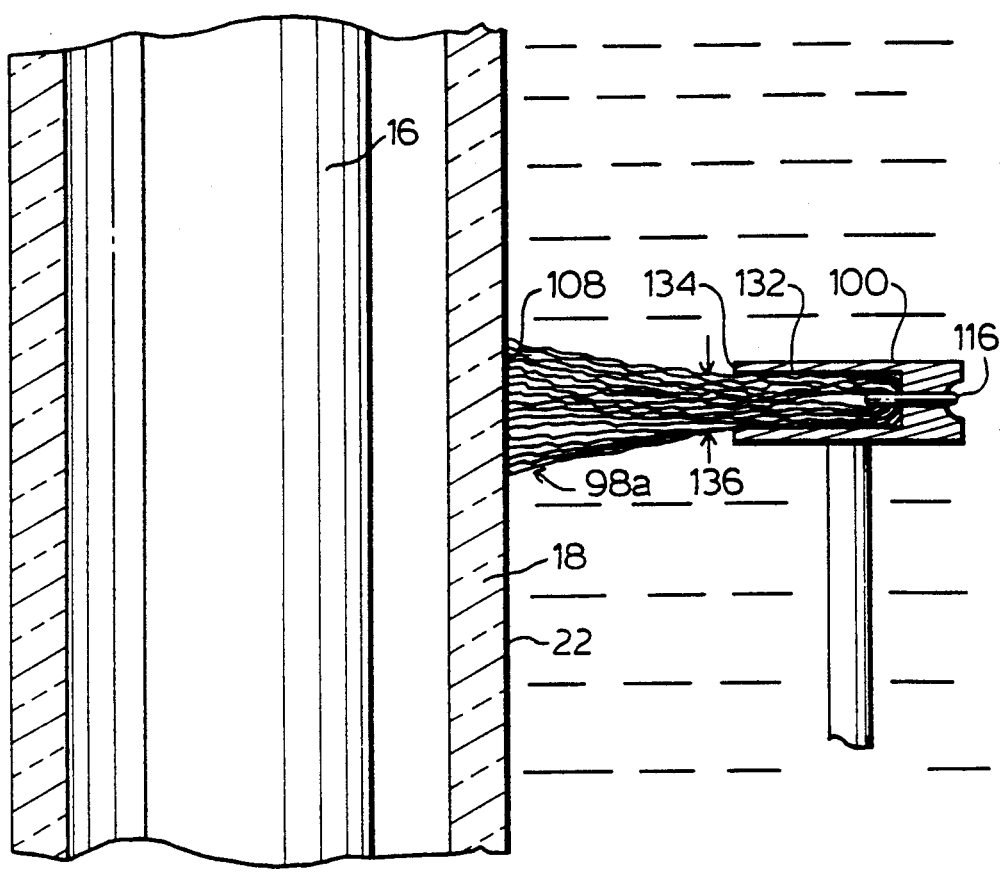
FIG. 4 is an enlarged section through a portion of the brush as it contacts the exterior surface of the protective sheath for the UV lamp.

Preferred plastics include, UV resistant and preferably high temperature resistant plastics, such as halogenated polyolefin such as Teflon ®, urethanes, synthetic rubbers and high density polypropylene. Preferred metals and metal alloys include, stainless steel, aluminum alloys, brass, nickel and chrome plated steel. Preferred stainless steels are, stainless steel 304 and 316. The bristles may be mounted in the bristle holder in accordance with a standard stitching technique. The bristle length is folded over and stitched in place with stitches 116 in holder 100 and 118 in holder 104, the details of which are shown in FIG. 4.

As is generally understood, the protective sheath 18 for the quartz lamp is extruded and blown within certain tolerances to define a hollow cylinder. Such extrusion blowing of the quartz tube can result in deviation in the roundness of the quartz tube as well as deviations in the length dimension such as curves or undulations in the quartz wall. Hence, the brushes, as they ride along or traverse the outside wall 22 of the quartz tube should be allowed to move laterally to follow the tolerances in deviations for the quartz tube. To accommodate such lateral movements in the brushes as they traverse the quartz tube, a preferred connector 96, for connecting the piston rod 52 to the carriage is shown. The connector 96 includes a slide 120 which, according to this embodiment, is connected to the bristle holder 104. The slide has opposing grooves 122 which receive a flat nuthead 124. The nuthead is threaded on the threaded end 126 of the rod 52. The nuthead can readily slide with opposing faces 128 aligned into the opposing grooves 122 in the direction of arrow 130. The nut 124 is therefore allowed to move relative to the slide in a lateral direction to accommodate lateral movement in the brush 94 as it rides along the quartz tube 18.

By virtue of the protective sheath 18 having tolerances along its length, the connector device 96 accommodates lateral movement of the brushes. It has however been found that the use of bristles is particularly advantageous in accommodating out of round dimensional tolerances for the sheath 18. With reference to FIG. 4, the protective sheath 18 has an exterior surface 22. As already noted, the protective sheath 18 is spaced apart from the lamp 16. Due to the interference fit provided by dimensioning of the bristle tips 108 relative to the external diameter of the sheath 18, the bristles are slightly flexed in the manner shown in FIG. 4. The bristles splay outwardly and are flexed slightly, at least in the tip region indicated at 98a, with an interference fit of approximately from 0.25 millimeters up to 1.5 millimeters.

It is appreciated that depending upon the type of material selected for the bristles, the extent of overlap or interference fit may vary for the stainless steel, the preferred interference fit being in the range of 0.75 millimeters.

The out-of-round aspect of the sheath is accommodated by flexing of the bristles as the tips of the bristles contact the sheath about its entire circumference. As the brush device is then moved along the sheath, all surfaces are contacted to remove any deposit material. This feature was difficult if not impossible to achieve with the prior art devices, particularly wiper rings and the like.

The bristles, as shown in FIG. 4, are stitched into the bristle holder 100 by stitches 116. The bristles are of a length such that they are folded over and held within the U-shaped groove 132 which defines at the base 134 of the bristle holder a width 136 for the bristles As the bristles splay outwardly and are slightly flexed in the region 98a, the bristle width at the face 22 of the protective sheath 18, is considerably wider.

As demonstrated in FIG. 3, such outward splay of the bristles, from the base 134, of the holder 104, causes the bristle tips to overlap in region 138 so that all surfaces around the protective sheath 18 are contacted by bristle tips.

Figure 5A:
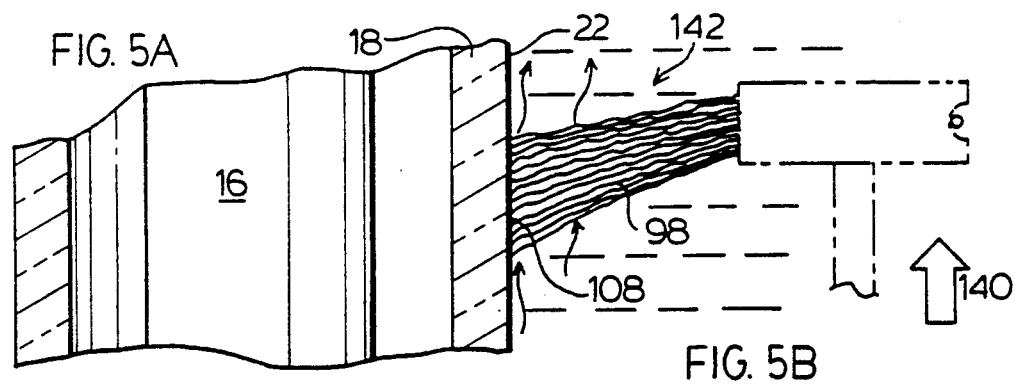
FIG. 5a is an enlarged section of the brush as it contacts the protective sheath and is moved in a first direction.
Figure 5B:
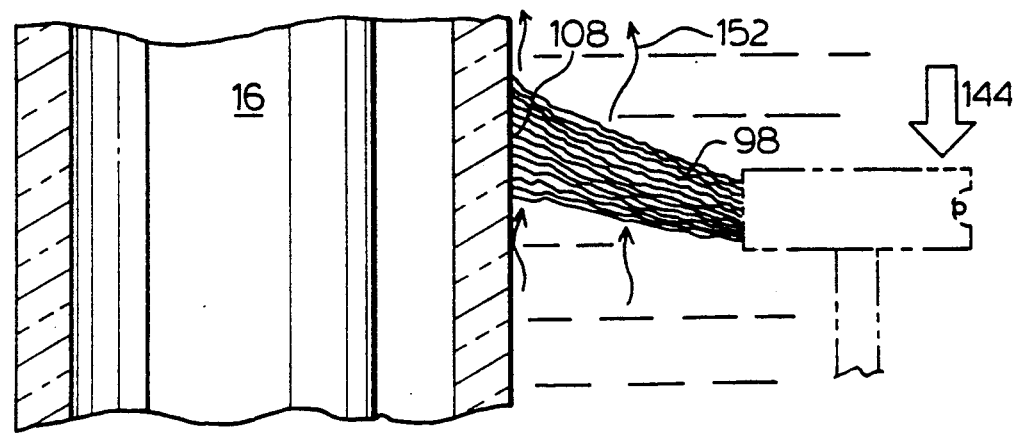
FIG. 5b is an enlarged section of the same brush as it is moved in the opposite direction along the protective sheath.

As shown in FIG. 5a, the brush is moved in the direction of arrow 140 so that the bristles, due to the interference fit are flexed in a direction opposite to arrow 140. The bristle tips 108 sweep the outer surface 22 of the tube 18 to remove any material deposited from the aqueous media, generally designated 142 from the outer surface 22. Similarly, when the brushes are moved in the direction of arrow 144 of FIG. 5b, the bristles 98 flex in a direction opposite to arrow 44. The tips 108 again serving by virtue of the interference fit to sweep the outer surface 22 of the protective sheath 18 and remove thereby, deposits on the outer surface.

It is understood that a suitable controller which controls the supply of the air to airlines 48 and 50 for the cylinders 38 is provided. The controller may be a standard form of programmable microprocessor which can generate signals to open and close pneumatic valves to determine which side of the double sided piston in cylinder 38 is charged with pressurized air to effect the reciprocal movement of the piston rod 52. Furthermore, input to the microprocessor is provided by way of sensors to detect the position of the brushes and signal the extremities of the up and down stroke. As shown in FIG. 2, a sensor 146 is provided on the cylinder to detect when the piston in the cylinder reaches an upper position which corresponds to the upper brush 92 reaching the upper part of its stroke. Similarly, sensor 148 is provided to correspondingly signal the bottom extremity of the brush stroke. The sensors are positioned to ensure cleaning of at least the UV radiation portion of the lamp which emits radiation within the reactor annular chamber 20. Signals are produced by sensors 146 and 148 to signal the extremities of the brush movement. As the brush commences its upward travel and sensor 146 is triggered, a signal is transmitted to the microprocessor to switch the valving and pressurize the cylinder in the opposite direction to cause retraction of the piston rod 52. Piston rod 52 is retracted slowly until sensor 148 is actuated to indicate the bottom of the downstroke.

The microprocessor may be programmed to determine the time period between each brushing of the sheath exterior. With most aqueous media to be treated, it is desirable to reciprocate the brushes at least once every 10 to 15 minutes. Such cycling of the brush movement significantly reduces the time that the brush system is actually operating. This is an important benefit over systems which have to operate on a continuous basis. The system of this invention therefore requires less maintenance and thereby improved serviceability. Although there may be systems which in use remain relatively cleaner and only require brushing of the sheath exterior once every hour. The space in between the brushes 92 and 94 is such to ensure that when brush 92 is at the uppermost position brush 94 traverses at least a portion of the region occupied by brush 92 in its lowermost position. In this manner all of the extended outer surface of the sheath 18 is brushed during each cycle of the brush system.

As already indicated, the temperature of the quartz tube for the UV lamp may be in the range of 950° C. hence the temperature of the protective sheath 18 will also assume a very high temperature, which may approximate the temperature of the quartz lamp. The aqueous media flowing along the outer surface 22 of the sheath provides a cooling effect but the surface may well be in excess of 250° C. One of the significant advantages of using a brush system is that only the brush tips are in point contact with the outer surface 22 of the protective sheath. This point contact minimizes the heat transferred to the bristles to reduce thereby high temperature stressing of the bristles. Furthermore, the bristles as they extend outwardly from the protective sheath, provide a form of cooling fin such that aqueous media flows over the bristles in the manner demonstrated in FIG. 5 in the direction of arrows 152. This flow of aqueous media cools the bristles to complement their longevity in use. This is particularly important when the bristles are of a plastic composition rather than the preferred stainless steel composition. The manner in which the bristles are constructed as shown in FIG. 3 provides spaces 154 between the bristle group so that liquids flow freely between the bristle group to provide additional cooling and avoid deformation or damage to the bristle holders 100 and 104.

The bristle number in each group is sufficient in each bristle group to provide a brush thickness in the range of 30 to 120 millimetres. This ensures that at any one time sufficient bristle tips are in contact with the outer surface of the sheath to effect the desired degree of cleaning and removal of deposited material on the outer surface of the protective sheath 18. The number of times or periods in which the brush system is reciprocated along the sheath thereby provides a form of transmittance control to maintain a desired level of transmittance of UV radiation emitted by the lamp 16.

It is appreciated that a single brush or multiples thereof may be provided. A suitable carriage or coupling device is provided for the one or more brushes to ensure their traversing of the protective sheath to give the desired cleaning effect. In the event that a single brush is used, a suitable mounting device is required to not only permit relative lateral movement but as well ensure that the brush does not slant relative to the longitudinal axis of the sheath which results in portions of the bristles not contacting the outer surface of the sheath. Furthermore, when two or more brushes are used, the third and fourth, etc. brushes may be connected to a continuation of the type of couplers shown in FIG. 3 or other types of connections to ensure that the brushes traverse the protective sheath in actuation of the air cylinder for a single cycle.

Although preferred embodiments of the invention are described herein in detail, it will be understood by those skilled in the art that variations may be made thereto without departing from the spirit of the invention or the scope of the appended claims.

I claim:

1. In a reactor having at least one UV radiation lamp for treating an aqueous solution, said lamp being positioned in said reactor within a protective UV radiation transparent sheath, said lamp being isolated from said aqueous solution by said sheath, means for removing material deposited on said sheath from an aqueous solution being treated in said reactor, the improvement in said means for removing deposits from said sheath comprising:
   a) a brush having a bristle holder adapted for surrounding the sheath, said bristle holder having a plurality of bristles extending inwardly from said bristle holder, raid brush being dimensioned such that said bristles along said brush holder surrounding the sheath are flexed at least when said brush is moved along the sheath to remove material deposited on the sheath, said bristles being individually in point contact with the sheath as tips of said bristles contact the sheath, and
   b) means for connecting said brush to an external drive for reciprocating said brush along the sheath, said connecting means being adapted to accommodate lateral movement of said brush as said brush moves along the sheath.

2. In a reactor of claim 1 wherein
   at least two of said brushes have said respective bristle holders mounted on a carriage,
   said at least two brushes being aligned on said carriage to contact said sheath as said at least two brushes are moved along said sheath, said connecting means connecting said carriage to said external drive.

3. In a reactor of claim 2 wherein
each of said brushes is circular,
said bristle holder being annular and said bristles extending radially inwardly therefrom, said bristle tips defining a circular opening for surrounding the sheath which is circular, said circular opening having a diameter less than an outside diameter for said sheath to induce said flexing in said bristles.

4. In a reactor of claim 3 wherein said bristles are stainless steel.

5. In a reactor of claim 4 wherein:
said drive is a reciprocating piston,
said piston having a rod extending through a wall of said reactor, said rod being sealed in said reactor wall to prevent leakage of an aqueous solution from said reactor,
said connecting means connecting said rod to said carriage, said connecting means comprising a slide for receiving a complementary projection, said slide being mounted on one of said rod or carriage and said projection being mounted on the other, said slide being oriented to permit lateral relative movement between said carriage and said wall during reciprocation of said carriage along said sheath.

6. A high intensity high temperature UV lamp reactor system for treating aqueous media on a continuous flow basis, said reactor system comprising:
a cylindrical reactor vessel having an inlet near a first end and an outlet near a second end to permit aqueous media to flow on continuous basis through said vessel,
a cylindrical UV lamp provided in said vessel and extending along and centrally of said vessel,
a cylindrical UV transparent sheath for physically isolating said UV lamp from interior space of said reactor vessel, said sheath extending along and centrally of said reactor vessel and being of a length at least equal to a UV radiation emitting portion of said UV lamp,
means for connecting and sealing said first and second ends of said vessel to said sheath to isolate thereby said UV lamp and to define in said vessel an annular reactor chamber in liquid communication with said inlet and said outlet,
means for brushing an exterior surface of said sheath in said annular chamber,
said brush means having at least two brushes, each of said brushes having an annular bristle holder having a plurality of bristles extending radially inwardly from said bristle holder,
said bristles having tips which define a circular opening for surrounding said sheath, said circular opening being of a diameter less than outside diameter for said sheath,
means for coupling said brushes in spaced apart manner on said sheath, said coupling means being connected to said brush holder of each said brush,
means for reciprocating said brush means along said sheath to brush said exterior surface of said sheath along its said length, and
means for connecting said reciprocating means to said coupling means for said brush means.

7. A reactor system of claim 6 wherein said lamp has an operating temperature in the range of 950° C.

8. A reactor system of claim 7 wherein said brush tips are in point contact with said sheath to minimize heat transfer through to said brush.

9. A reactor system of claim 7 wherein said bristle is of a metal selected from the group consisting of stainless steel, aluminum alloys, brass, nickel plated steel and chrome plated steel.

10. A reactor system of claim 6 wherein said brush coupling means comprises:
a plurality of equal length rods, the ends of which are secured to respective bristle holders of any two of said at least two brushes to form said coupling means,
said brushes being spaced apart by a distance equal to said length of said rods,
said connecting means being connected to one of said bristle holders which forms part of said coupling means,
said rods being spaced outwardly of said sheath a distance approximating a radial length of said bristles.

11. A reactor system of claim 10 wherein said connecting means comprises a slide connected to one of said coupling means and said reciprocating means,
the other of said coupling means and said reciprocating means having a complementary projection for engaging said slide,
said slide being oriented to permit lateral relative movement between said coupling means and said reciprocating means during reciprocation of said brush means along said sheath.

12. A reactor system of claim 10 wherein a plurality of baffles are provided in said annular reactor, said baffles being positioned in said annular chamber to avoid interference with reciprocal movement of said brush means.

13. A reactor of claim 6 wherein each of said brushes has a sufficient number of bristles across said holder to define a brush thickness in the range of 30 to 120 millimetres.

14. A reactor of claim 6 wherein said bristles flex due to said circular opening of each brush being of a diameter less than said sheath outside diameter, said diameters overlapping to an extent to provide an interference fit ranging from 0.25 to 1.5 millimeters.

15. A reactor system of claim 14 wherein said interference is in the range of 0.75 millimeters.

16. A reactor system of claim 6 wherein
said bristles are located in said bristle holder in discrete groups to provide thereby spacing between the bristle groups at said bristle holder,
said bristles of any one bristle group splaying outwardly to provide overlap of bristle tips for adjacent groups.

* * * * *